(12) United States Patent
Kim et al.

(10) Patent No.: US 11,088,387 B2
(45) Date of Patent: Aug. 10, 2021

(54) COIN-TYPE SECONDARY BATTERY, MANUFACTURING METHOD THEREFOR, AND APPARATUS FOR CHARGING/DISCHARGING COIN-TYPE SECONDARY BATTERY

(71) Applicant: UNIST (ULSAN NATIONAL INSTITUTE OF SCIENCE AND TECHNOLOGY), Ulsan (KR)

(72) Inventors: Young Sik Kim, Ulsan (KR); Jin Hyup Han, Ulsan (KR); Soo Min Hwang, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 111 days.

(21) Appl. No.: 15/576,762

(22) PCT Filed: May 25, 2016

(86) PCT No.: PCT/KR2016/005527
§ 371 (c)(1),
(2) Date: Nov. 24, 2017

(87) PCT Pub. No.: WO2016/190659
PCT Pub. Date: Dec. 1, 2016

(65) Prior Publication Data
US 2018/0301738 A1 Oct. 18, 2018

(30) Foreign Application Priority Data

May 26, 2015 (KR) .................. 10-2015-0073108
May 13, 2016 (KR) .................. 10-2016-0059039

(51) Int. Cl.
*H01M 10/04* (2006.01)
*H01M 10/054* (2010.01)
(Continued)

(52) U.S. Cl.
CPC ......... *H01M 10/0427* (2013.01); *H01M 4/38* (2013.01); *H01M 4/485* (2013.01);
(Continued)

(58) Field of Classification Search
CPC ............... H01M 10/04; H01M 10/056; H01M 10/0427; H01M 10/0585; H01M 10/052;
(Continued)

(56) References Cited

U.S. PATENT DOCUMENTS

| | | | | |
|---|---|---|---|---|
| 2014/0076730 A1* | 3/2014 | Kim | ............... | H01M 4/381 205/99 |
| 2014/0162108 A1* | 6/2014 | Visco | ............... | H01M 4/366 429/131 |

(Continued)

FOREIGN PATENT DOCUMENTS

| | | |
|---|---|---|
| JP | H08-017446 A | 1/1996 |
| JP | 2010-277737 A | 12/2010 |

(Continued)

OTHER PUBLICATIONS

International Search Report issued in PCT/KR2016/005527; dated Sep. 12, 2016.

*Primary Examiner* — Karie O'Neill Apicella
(74) *Attorney, Agent, or Firm* — Studebaker & Brackett PC

(57) ABSTRACT

The present invention relates to a coin-type secondary battery and a manufacturing method therefor and, specifically, can provide: a coin-type secondary battery, wherein a solid electrolyte is applied to an anode part, an ion-containing solution comprising sodium, lithium, magnesium and a combination thereof is applied to a cathode part, and the ion-containing solution flows in from the outside of the cathode part; and a manufacturing method therefor.

10 Claims, 9 Drawing Sheets

(51) Int. Cl.
| | |
|---|---|
| *H01M 10/0585* | (2010.01) |
| *H01M 50/40* | (2021.01) |
| *H01M 50/109* | (2021.01) |
| *H01M 4/485* | (2010.01) |
| *H01M 4/583* | (2010.01) |
| *H01M 4/66* | (2006.01) |
| *H01M 10/052* | (2010.01) |
| *H01M 10/056* | (2010.01) |
| *H01M 4/38* | (2006.01) |
| *H01M 10/0562* | (2010.01) |
| *H01M 10/46* | (2006.01) |
| *H01M 4/02* | (2006.01) |

(52) U.S. Cl.
CPC ........... *H01M 4/583* (2013.01); *H01M 4/661* (2013.01); *H01M 10/04* (2013.01); *H01M 10/052* (2013.01); *H01M 10/054* (2013.01); *H01M 10/056* (2013.01); *H01M 10/0562* (2013.01); *H01M 10/0585* (2013.01); *H01M 10/46* (2013.01); *H01M 50/109* (2021.01); *H01M 50/40* (2021.01); *H01M 2004/027* (2013.01); *H01M 2004/028* (2013.01)

(58) Field of Classification Search
CPC .... H01M 10/054; H01M 4/583; H01M 4/485; H01M 4/66; H01M 4/661
See application file for complete search history.

(56) References Cited

U.S. PATENT DOCUMENTS

2014/0234732 A1* 8/2014 Park .................... H01M 4/1395
429/405
2014/0234733 A1* 8/2014 Roev ................... H01M 4/8657
429/405

FOREIGN PATENT DOCUMENTS

| | | |
|---|---|---|
| JP | 2012-055086 A | 3/2012 |
| KR | 10-1238898 B1 | 3/2013 |

* cited by examiner

US 11,088,387 B2

COIN-TYPE SECONDARY BATTERY, MANUFACTURING METHOD THEREFOR, AND APPARATUS FOR CHARGING/DISCHARGING COIN-TYPE SECONDARY BATTERY

CROSS REFERENCE TO RELATED APPLICATIONS

This application claims the priority of Korean Patent Application Nos. 10-2015-0073108, filed on May 26, 2015 and 10-2016-0059039, filed on May 13, 2016, in the Korean Intellectual Property Office. Further, this application is a National Phase application of International Application No. PCT/KR2016/005527 filed on May 25, 2016, which is incorporated herein by reference in its entirety.

TECHNICAL FIELD

The present invention relates to a coin-type secondary battery, a method for manufacturing a coin-type secondary battery, and an apparatus for charging and discharging a coin-type secondary battery.

BACKGROUND ART

Generally, a secondary battery refers to a battery capable of being charged and discharged through a conversion between chemical energy and electric energy using a material capable of electrochemically reacting with a cathode and an anode. The secondary battery is mainly used in applications in which a large amount of electric power storage is required, such as a vehicle, a ship, or the like.

A typical example of the secondary battery includes a lithium secondary battery that generates electric energy due to a change in a chemical potential thereof when an ion of a metal (e.g., lithium, sodium, or the like) is intercalated and deintercalated in a cathode and anode thereof.

The lithium secondary battery is manufactured using a material capable of reversible intercalation and deintercalation of lithium ions as an active material of the cathode and anode thereof, and filling an organic electrolyte or a polymer electrolyte in a space between the cathode and the anode.

However, a limited amount of lithium is present on Earth, and lithium is generally obtained from a mineral, a salt lake, and the like through a difficult process. Therefore, there is a problem in that high costs and high energy are used for manufacturing a battery, and thus a next-generation secondary battery which allows lithium to be replaced with another material is needed.

Such a lithium ion battery has a risk of explosion, and a lithium metal oxide (e.g., $LiCoO_2$, $LiMn_2O_4$, and the like) used as an active material of a cathode thereof has a high price, and thus there are problems in that high costs are required to implement a large scale energy storage system (ESS), and environmental problems may be caused during disposal of waste batteries. Further, when an installation site is selected, a social issue such as objection of residents and the like is highly likely to arise due to a lithium ion battery facility being mistaken for a facility such as a nuclear power plant.

To overcome these problems, it is necessary to reduce the risk of explosion and select materials that are eco-friendly, abundant on Earth, and are inexpensive, and thus it is necessary for a battery system capable of preventing a conflict with community members when an installation site thereof is selected to be developed, but research on such a battery system is insufficient.

DISCLOSURE

Technical Problem

To overcome the above problems, the inventors of the present invention propose a coin-type secondary battery in which a solid electrolyte selectively passing a specific metal ion is applied to an anode part thereof and an ion-containing solution (e.g., seawater) including sodium, lithium, magnesium, and a combination thereof is applied to a cathode part thereof, wherein the ion-containing solution flows into the cathode part from the outside of the cathode part, and a method for manufacturing the same.

Further, the inventors of the present invention propose an apparatus for easily charging and discharging a coin-shaped secondary battery.

Technical Solution

According to one embodiment of the present invention, there is provided a coin-type secondary battery including an anode part; a cathode part; a separator disposed between the anode part and the cathode part; a first case disposed outside the anode part; and a second case disposed outside the cathode part and including one or more openings, wherein the first case and the second case are bonded to each other; the anode part, the separator, and the cathode part are sealed by the first case and the second case which are bonded; the anode part includes an anode bottom case, an anode current collector disposed on the anode bottom case, and an anode upper case to which one or more solid electrolytes are bonded; the anode upper case includes one or more openings; the one or more solid electrolytes are disposed at the one or more openings in the anode upper case; the cathode part includes an ion-containing solution containing sodium, lithium, magnesium, and a combination thereof, and a cathode current collector impregnated into the ion-containing solution; and the ion-containing solution flows into the cathode part from the outside of the second case through the one or more openings of the second case.

Specifically, a description of the anode part is as follows.

The anode part may further include an adhesive disposed on each of the one or more solid electrolytes which are disposed at the one or more openings in the anode upper case, and configured to bond the electrolyte to the anode upper case.

More specifically, the adhesive may include one or more materials selected from the group consisting of a silicon (Si) based material, an epoxy based material, and a combination thereof.

In the anode part, the solid electrolyte may be selected from the group consisting of a Na superionic conductor (NASICON), a Li superionic conductor (LISICON), an amorphous ion conductive material, a ceramic ion conductive material, and a combination thereof.

The anode part may further include an anode active material layer disposed over the anode current collector, the anode active material layer may include an anode active material, and the anode active material may be one or more materials selected from the group consisting of a metal, a metal oxide, a metal sulfide, a metal phosphide, a carbon-based material, and a combination thereof.

The anode part may further include a liquid electrolyte.

The liquid electrolyte may include a dissociable salt and an organic solvent.

At this point, the dissociable salt may be one or more materials selected from the group consisting of a sodium compound, a lithium compound, an ammonium compound, and a combination thereof.

Further, the organic solvent may be one or more materials selected from the group consisting of an ether-based organic solvent, a carbonate-based organic solvent, a nitrile-based organic solvent, and a combination thereof.

Meanwhile, a description of the cathode part is as follows.

In the cathode part, the ion-containing solution may be selected from the group consisting of seawater, salty water, and a combination thereof.

The cathode part may further include a catalyst electrode disposed on the cathode current collector, and the catalyst electrode may include one material selected from the group consisting of a metal oxide, a novel metal material, a carbon-based material, a perovskite-based material, and a combination thereof.

According to another embodiment of the present invention, there is provided a method for manufacturing a coin-type secondary battery, the method including bonding one or more solid electrolytes to an anode upper case; forming an anode active material layer on an anode current collector; sequentially stacking the anode current collector and the anode upper case to which the one or more solid electrolytes are bonded on an anode bottom case to obtain an anode part; sequentially stacking the anode part, a separator, a cathode current collector, and a second case including one or more openings on a first case; bonding the first case to the second case; and introducing an ion-containing solution containing sodium, lithium, magnesium, and a combination thereof from the outside of the second case into an interior thereof, wherein, in the bonding of the one or more solid electrolytes to the anode upper case, one or more openings are disposed in the anode upper case and the one or more solid electrolytes are bonded to the one or more openings in the anode upper case; and, in the introducing of the ion-containing solution containing sodium, lithium, magnesium, and a combination thereof from the outside of the second case into a cathode part, the ion-containing solution flows from the outside of the second case into the cathode part through the one or more openings of the second case.

Specifically, the bonding of the one or more solid electrolytes to the anode upper case may include bonding the one or more solid electrolytes to the anode upper case using an adhesive.

At this point, the adhesive may include one or more materials selected from the group consisting of a silicon (Si) based material, an epoxy-based material, and a combination thereof.

Each of the one or more solid electrolytes may be selected from the group consisting of NASICON, LISICON, an amorphous ion conductive material, a ceramic ion conductive material, and a combination thereof.

According to one embodiment of the present invention, there is provided a charging and discharging apparatus including a vessel filled with a solution containing water or sodium ions; a jig part installed at the vessel, having an interior in which a coin-type secondary battery is mounted, and configured to allow a cathode part of the coin-type secondary battery to be brought into contact with the solution in the vessel; an anode terminal installed at the jig part and electrically connected to an anode part of the coin-type secondary battery; and a cathode terminal electrically connected to the cathode part of the coin-type secondary battery.

The jig part may include a case installed at the vessel and in which a seating part on which the coin-type secondary battery is seated is formed at a front surface of the case facing an interior of the vessel; a sealing member installed to surround an outer circumference of the coin-type secondary battery and configured to seal between an anode part of the coin-type secondary battery and the case to block the solution from flowing into the anode part in the case; and a cover member coupled to the front surface of the case, configured to tightly pressurize the sealing member, and in which a hole is formed on a front surface thereof to expose the cathode part of the coin-type secondary battery.

The case may have a structure in which a circular flange is formed along an outer circumference of the front surface of the case, and a male screw thread is formed on an outer circumferential surface of the circular flange so that the case is screw-coupled to a female screw thread of a hole formed on a side surface of the vessel to be detachably installed thereat.

The case may have a structure in which a ring member configured to seal is installed at the circular flange to seal between the case and the vessel.

The cover member may have a structure in which a male screw thread is formed on an outer circumferential surface of a distal end of the cover member, and the cover member is screw-coupled to the circular flange of the case to be detachably installed thereat wherein a female screw thread is formed on an inner circumferential surface of the circular flange of the case.

The cover member may have a structure in which a handle is formed to protrude from the cover member to allow the cover member to be rotated against the case.

The sealing member may be in a ring form in which a hole is formed to expose the cathode part of the coin-type secondary battery, and may have a structure in which an inner circumferential surface of the sealing member is processed and stepped to correspond to the outer circumference of the coin-type secondary battery to surround the outer circumference thereof.

The sealing member may be formed of a silicone material.

The anode terminal may include an anode rod installed to pass through the interior of the case and be electrically connected to the anode part of the coin-type secondary battery.

The anode terminal may further include an electrode plate installed at the seating part of the case to be brought into contact with the anode part of the coin-type secondary battery, and the anode rod may have a structure which is electrically connected to the anode part of the coin-type secondary battery through the electrode plate.

The anode terminal may have a structure in which the anode rod is formed in a bolt shape and is screw-coupled to the case to pressurize the electrode plate such that the electrode plate is brought into close contact with the anode part of the coin-type secondary battery.

The cathode terminal may include a cathode rod installed to pass through the interior of the cover member and be electrically connected to the cathode part of the coin-type secondary battery.

The cathode terminal may further include carbon felt disposed between the cathode rod and the cathode part of the coin-type secondary battery and configured to come into contact with the cathode part.

The cathode rod may have a structure in which a distal end of the cathode rod in contact with the cathode part of the coin-type secondary battery is wound in a coil form to constitute a coil spring configured to apply an elastic force between the cover member and the cathode part.

The cathode rod may be formed of a titanium material.

The charging and discharging apparatus may further include an oxygen supplier configured to supply oxygen to the solution.

The oxygen supplier may include a circulation pipe connected to the vessel in which the solution is accommodated to discharge the solution; a pump connected to the circulation pipe and configured to circulate the solution; and a discharge pipe connected to an outlet side of the pump and extending above the vessel to discharge the solution discharged through the pump over the solution of the vessel.

Advantageous Effects

In accordance with one embodiment of the present invention, a solid electrolyte selectively passing a specific metal ion is applied to an anode part of a coin-type secondary battery, and an ion-containing solution flowing from the outside and containing sodium, lithium, magnesium, and a combination thereof, which are eco-friendly and safe materials, is used in a cathode part thereof, and thus an ocean, in which seawater, among ion-containing solutions, is abundant, can be selected as a suitable site for installing a large-scale storage system, so that a coin-type secondary battery capable of reducing costs for installation and in which environmental problems may be relatively less caused can be provided.

In accordance with another embodiment of the present invention, a method for manufacturing a coin-type secondary battery which is advantageous for commercialization and mass production with a simplified manufacturing process can be provided.

In accordance with the embodiments, charging and discharging of the coin-type secondary battery can be more easily performed.

In accordance with the embodiments, the cathode part and the anode part of the coin-type secondary battery are properly separated from each other such that a short-circuit between the anode part and the cathode part caused by seawater can be reliably prevented.

In accordance with the embodiments, assembly of the coin-type secondary battery can be easily performed, and a charge and discharge test for the coin-type secondary battery can be easily performed. Therefore, various charge and discharge tests for the coin-type secondary battery can be more easily performed.

MODES OF THE INVENTION

Hereinafter, embodiments of the present invention will be described in detail. However, these embodiments are illustrative, and the present invention is not limited thereto and is only defined by the scope of the appended claims.

In one embodiment of the present invention, there is provided a coin-type secondary battery including an anode part; a cathode part; a separator disposed between the anode part and the cathode part; a first case disposed outside the anode part; and a second case disposed outside the cathode part and including at least one opening, wherein the first case and the second case are bonded to each other; the anode part, the separator, and the cathode part are sealed by the first case and the second case which are bonded; the anode part includes an anode bottom case, an anode current collector disposed on the anode bottom case, and an anode upper case to which one or more solid electrolytes are bonded; the anode upper case includes one or more openings; the one or more solid electrolytes are disposed at the one or more openings in the anode upper case, respectively; the cathode part includes an ion-containing solution containing sodium, lithium, magnesium, and a combination thereof, and a cathode current collector impregnated with the ion-containing solution; and the ion-containing solution flows into the cathode part from the outside of the second case through the one or more openings of the second case.

Figure 1:
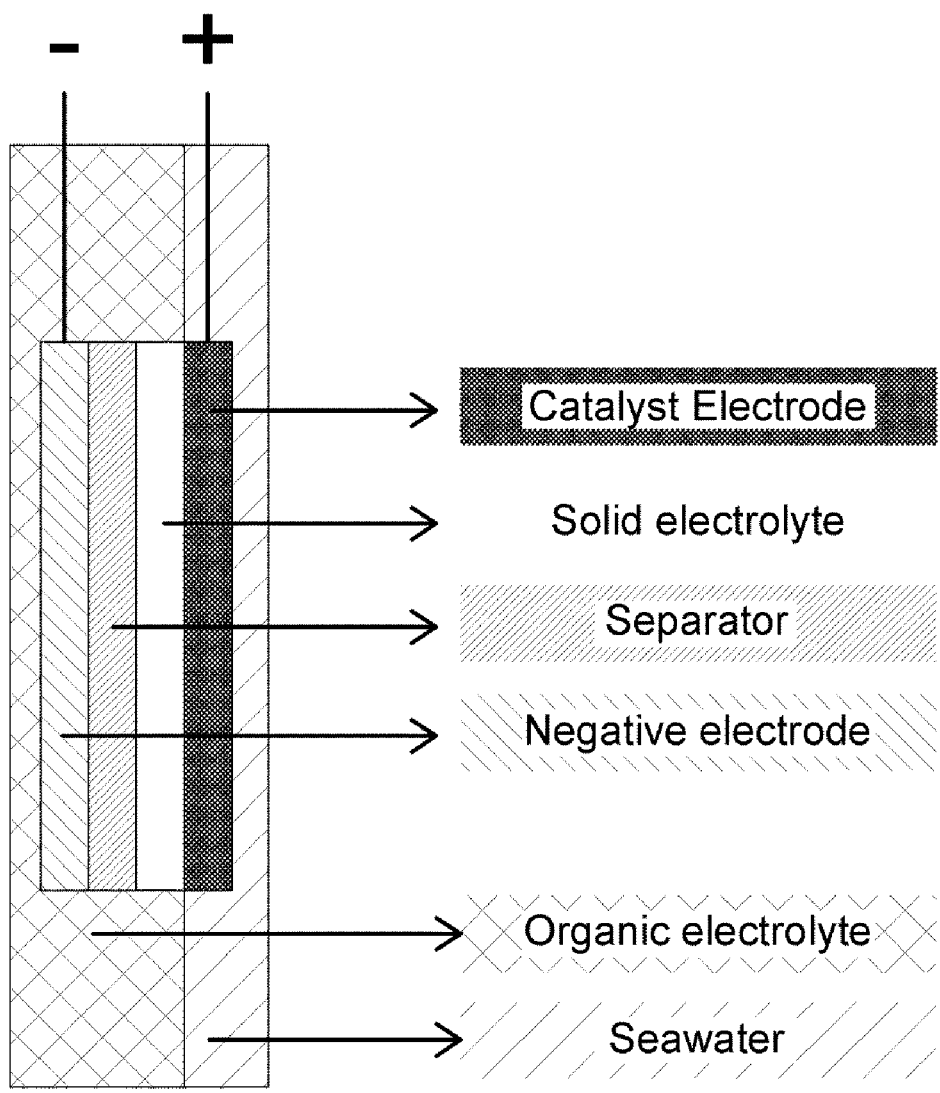
FIGS. 1 and 2 are each a diagram schematically illustrating a side view of a portion of a coin-type secondary battery according to one embodiment of the present invention.
Figure 2:
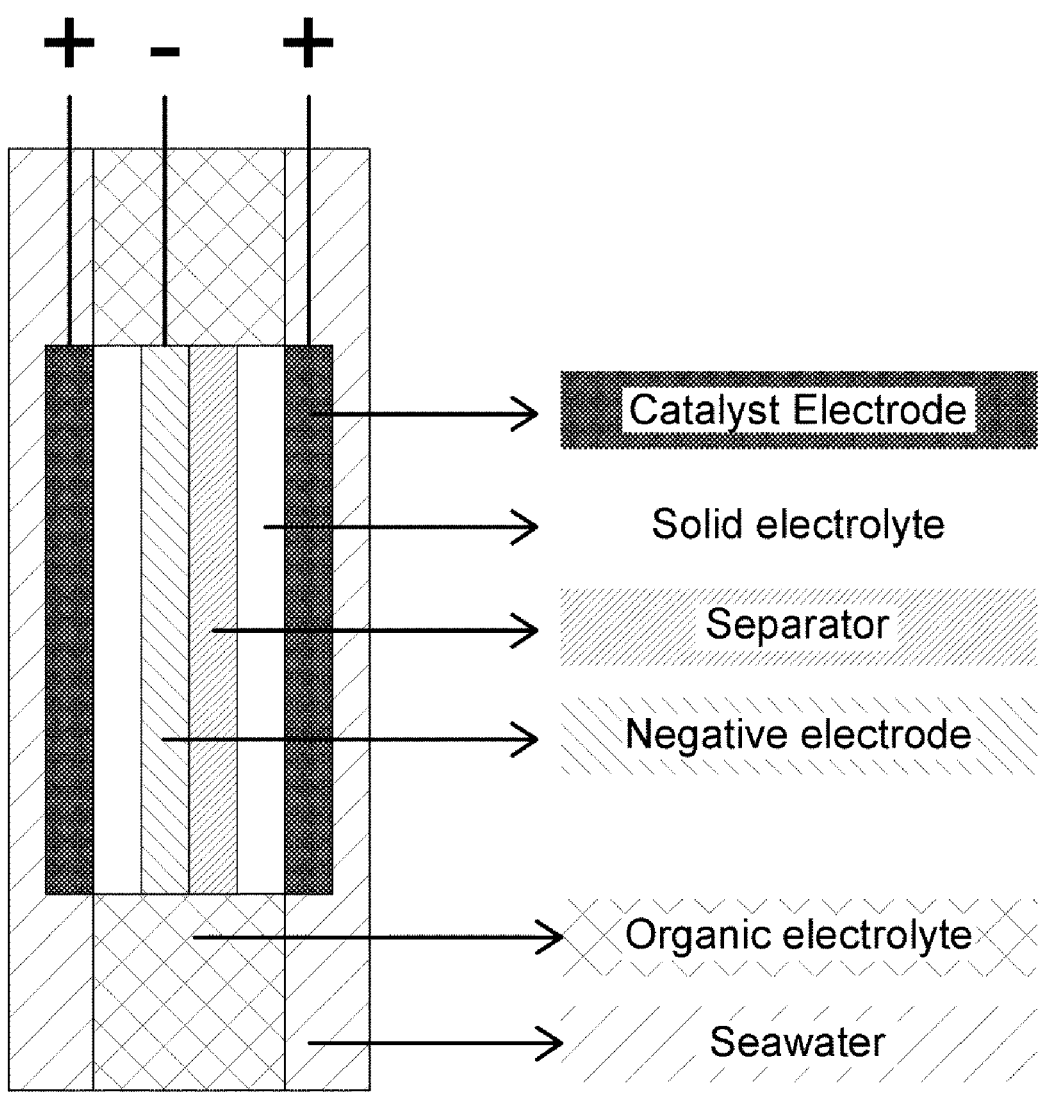

In this regard, FIG. 1 schematically shows a side view of the coin-type secondary battery. Meanwhile, the coin-type secondary battery may include a single cathode part, as shown in FIG. 1, and may include two cathode parts, as shown in FIG. 2.

Figure 3:
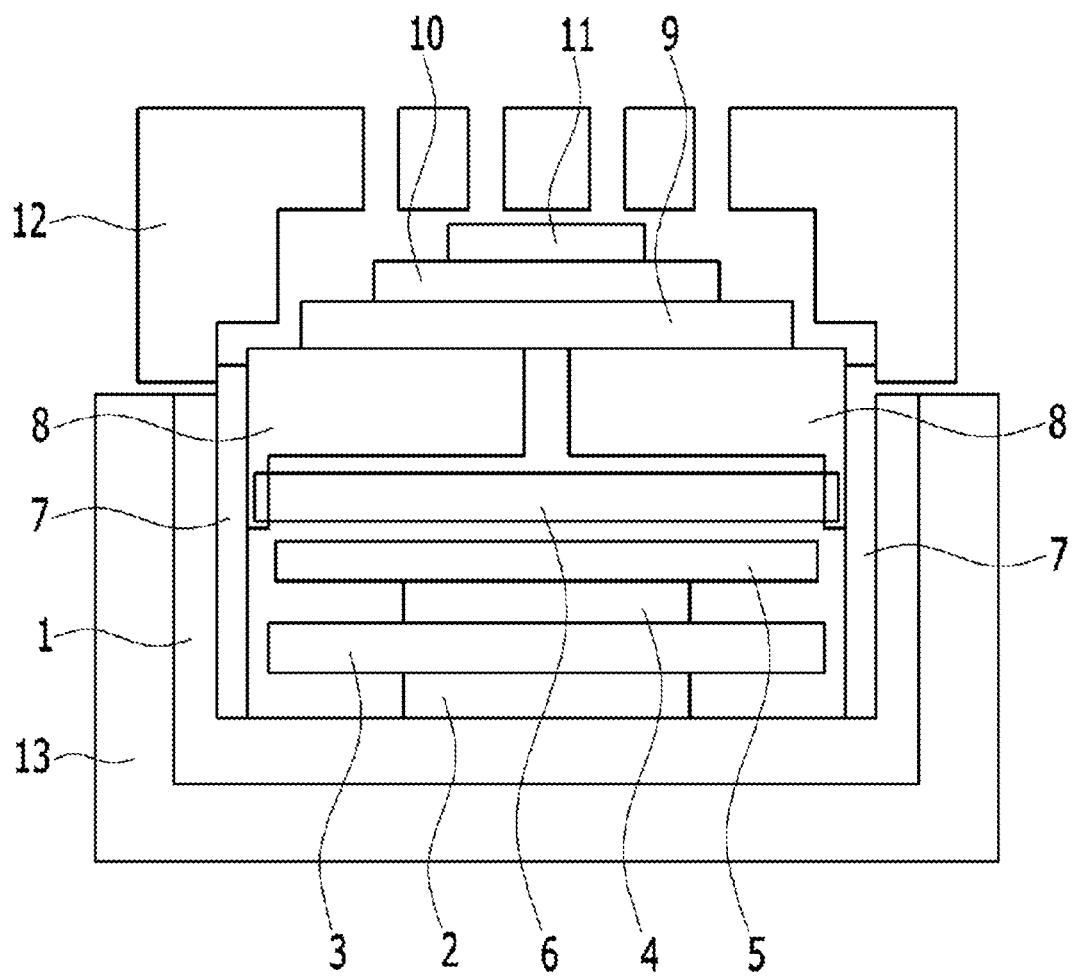
FIG. 3 is a diagram schematically illustrating a side view of a coin-type secondary battery manufactured according to one embodiment of the present invention.

Specifically, the coin-type secondary battery shown in FIG. 1 is actually implemented in the form of FIG. 3 in one embodiment of the present invention. More specifically, referring to FIG. 3, the coin-type secondary battery includes an anode part in which an anode bottom case 1, an anode current collector 2, an anode plate spacer 3, an anode active material 4, an in-anode separator 5, a solid electrolyte 6, and an anode upper case 8 are sequentially stacked in the anode part, and a cathode part in which a cathode catalyst electrode 10 and a cathode current collector 11 are sequentially stacked, and a separator 9, which is a non-electric conductive diaphragm, is disposed between the anode part and the cathode part to prevent a short circuit therebetween. Further, the anode part and the cathode part are sealed by a first case 13 and a second case 12 which are bonded to each other.

Specifically, one or more openings are provided in the second case 12 so that an ion-containing solution may flow from the outside of the coin-type secondary battery into the cathode part through the one or more openings of the second case. In FIG. 3, a case in which three openings are provided in the second case 12 is exemplified, but the present invention is not limited thereto.

Further, one or more openings may be provided in the anode upper case 8, the solid electrolyte 6 may be bonded to the one or more openings of the anode upper case 8, and the anode upper case 8 and the solid electrolyte 6 may be bonded by an adhesive (not shown). In FIG. 3, a case in which one opening is provided in the anode upper case 8 is exemplified, but the present invention is not limited thereto.

Meanwhile, a liquid electrolyte (not shown) may be included in the anode part, and the anode current collector 2, the anode plate spacer 3, the anode active material 4, the in-anode separator 5, and the solid electrolyte 6 may be impregnated with the liquid electrolyte (not shown). Further, a gasket 7 may be disposed in a space between the anode bottom case 1 and the anode upper case 8, and the gasket 7 may serve to protect inner materials thereof and prevent leakage of the liquid electrolyte (not shown) injected into the anode part.

Hereinafter, components of the coin-type secondary battery will be described with reference to FIGS. 1 and 3.

The anode part will be described as follows first.

The anode part includes the anode current collector between the anode bottom case and the anode upper case including the one or more openings, and the solid electrolyte is bonded to each of the one or more openings of the anode upper case.

As described above, the one or more solid electrolytes are applied to the anode part such that the battery can be stably driven by specific metal ions selectively passing therethrough. At this point, the solid electrolyte is applied in a form shown in FIG. 4.

Figure 4:
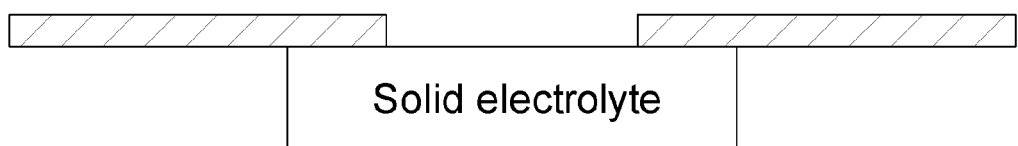
FIGS. 4 and 5 are diagrams schematically illustrating a side view of a portion of an anode part included in the coin-type secondary battery according to one embodiment of the present invention.

Specifically, FIG. 4 schematically shows a portion of the solid electrolyte bonded to each of the openings in the anode upper case when viewed from a side thereof. Although a case in which a single opening in the anode upper case and a single solid electrolyte are provided is shown in FIG. 4, a bonded form may be determined with reference to the fact that one or more openings and one or more solid electrolytes are provided in the anode upper case.

In FIG. 4, the opening is disposed in the anode upper case, and a solid electrolyte having a size that is greater than that of the opening is disposed at a rear surface of the anode upper case and is exposed at a front surface of the anode upper case by the opening thereof.

It may be determined that the solid electrolyte is exposed by the opening of the anode upper case with reference to the above description. As described above, the exposed portion of the solid electrolyte may be a path through which a specific metal ion selectively passes, and the solid electrolyte may be formed to have an area that is larger than that of a conventionally known solid electrolyte.

Meanwhile, the anode part may be disposed over the solid electrolyte disposed at each of the openings in the anode upper case, and the anode part may further include an adhesive bonding the solid electrolyte to the anode upper case.

Figure 5:
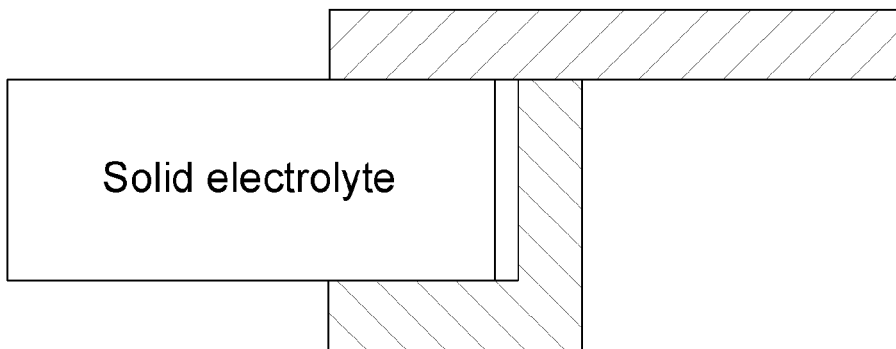

FIG. 5 schematically shows a portion of a side view when the solid electrolyte is bonded to the anode upper case by the adhesive. Specifically, in FIG. 5, a case in which a single opening in the anode upper case and a single solid electrolyte are provided is shown.

Referring to FIG. 5, it can be seen that a form in which the adhesive bonds the solid electrolyte to the anode upper case is not limited to a specific form as long as the adhesive bonds the solid electrolyte to the anode upper case while being disposed to cover a portion of the solid electrolyte.

More specifically, the adhesive may include one or more materials selected from the group consisting of a silicon (Si) based material, an epoxy based material, and a combination thereof.

Meanwhile, the solid electrolyte is not limited to a material which selectively passes specific metal ions (e.g., $Li^+$, $Na^+$, and the like). Specifically, the solid electrolyte may be a material through which the metal ions selectively passes at a high rate and in which an interface with an aqueous solution and an organic solution is stably formed.

For example, the solid electrolyte may be selected from the group comprising a Na superionic conductor (NASICON), a Li superionic conductor (LISICON), an amorphous ion conductive material, a ceramic ion conductive material, and a combination thereof.

Specifically, examples of the amorphous ion conductive material may include a phosphorus-based glass, an oxide-based glass, an oxide/sulfide-based glass, and the like.

Further, examples of the ceramic ion conductive material may include lithium beta-alumina, sodium beta-alumina, and the like.

More specifically, when a NASICON is selected as the solid electrolyte, ion conductivity of the solid electrolyte can be further improved.

On the other hand, the anode part may further include a conductive polymer membrane disposed to cover the adhesive while being adjacent to the solid electrolyte. In this case, electron conductivity can be improved by the conductive polymer membrane.

The polymer contained in the conductive polymer membrane is not particularly limited as long as the polymer has conductivity. For example, the polymer may be a polymer selected from the group consisting of a polyacetylene-based polymer, a polypyrrole-based polymer, a polyaniline-based polymer, a polyphenylene sulfide (PPS) based polymer, a polythiophene-based polymer, a PEDOT-based polymer, and the like.

The anode part may further include an anode active material layer disposed over the anode current collector, and the anode active material layer may include an anode active material, and the anode active material may be one or more materials selected from the group consisting of a metal, a metal oxide, a metal sulfide, a metal phosphide, a carbon-based material, and a combination thereof.

For example, sodium (Na), tin (Tn), antimony (Sb), bismuth (Bi), alloys thereof, oxides thereof, sulfides thereof, or phosphides thereof can be selected as the anode active material, and an anode active material such as a carbon-based material or a mixture of the above-described materials, which are generally known in the art, can also be selected.

Meanwhile, the anode active material layer may include the anode active material, a conductive material, and/or a binder. The conductive material is used to impart conductivity, and any material may be used as long as the material has electron conductivity without causing a chemical change in a battery which is constituted thereby. Further, the binder may employ any material as long as the binder serves to adhere particles of the anode active material to each other, and the anode active material to the anode current collector.

The anode part may further include a liquid electrolyte.

The liquid electrolyte may include a dissociable salt and an organic solvent.

At this point, the organic solvent acts as a medium through which ions involved in an electrochemical reaction of the battery may move. For example, the organic solvent may be one or more materials selected from the group consisting of an ether-based organic solvent, a carbonate-based organic solvent, a nitrile-based organic solvent, and a combination thereof.

More specifically, examples of the ether-based organic solvent may include tri-ethylene glycol-di-methyl ether (TEGDME) and the like, examples of the carbonate-based organic solvent may include propylene carbonate (PC), ethyl-methylene carbonate (EMC), di-methylene carbonate (DMC), ethylene carbonate (EC), and the like, and examples of the nitrile-based organic solvent may include acetonitrile (ACN) and the like.

Further, the dissociable salt is a material that is dissolved in the organic solvent and acts as a supply source of cations in a battery, thereby serving to enable a basic operation of a secondary battery and promote movement of the cations between a cathode and an anode. For example, the dissociable salt may be one or more materials selected from the group consisting of a sodium compound, a lithium compound, an ammonium compound, and a combination thereof.

More specifically, examples of the sodium compound may include $NaCF_3SO_3$, $NaPF_6$, $NaBF_4$, and the like, examples of the lithium compound may include $LiPF_6$, $LiBF_4$, $LiClO_4$, and the like, and examples of the ammonium compound may include $Et_4NBF_4$, $Et_4NPF_6$, and the like.

Each of the anode bottom case and the anode upper case may be made of a metal, such as steel use stainless (SUS), aluminum (Al), or steel, or a nonferrous metal. At this point, each of the anode bottom case and the anode upper case may be in a coin form having a diameter in a range of 2 cm to 10 cm and a thickness in a range of 0.1 to 2.0 t. Further, the anode upper case may include one or more openings, as described above, and each of the one or more openings of the anode upper case may have a diameter in a range of 0.5 cm to 9 cm.

As described above, the size of the solid electrolyte may be larger than that of the opening of the anode upper case. Conversely, when the size of the solid electrolyte is smaller than that of the opening, the solid electrolyte may be separated from the anode upper case through the opening without being bonded thereto. Specifically, each of the solid electrolytes bonded to the anode upper case may have a diameter in a range of 1 cm to 10 cm, and the form of each of the solid electrolytes is not limited to that described above.

The anode current collector may be made of a nonferrous metal such as a copper foil, a nickel foil, a stainless steel foil, a titanium foil, a nickel foam, a copper foam, a polymer base material coated with a conductive metal, or the like. At this point, the anode current collector may be in a coin form having a diameter in a range of 1 cm to 9 cm and a thickness in a range of 0.1 to 2.0 t.

The cathode part will be described as follows.

In the cathode part, the ion-containing solution containing sodium, lithium, magnesium, and a combination thereof may be selected from the group consisting of seawater, salty water and a combination thereof.

Specifically, when seawater is selected as the ion-containing solution, an installation site of the coin-type secondary battery may be the sea, and thus seawater may flow from the outside of the second case into the cathode part through the opening of the second case. In this case, the coin-type secondary battery may be suitable for installation as a large-scale storage system so that costs for the installation can be reduced and environmental problems can be relatively less caused.

Meanwhile, the cathode current collector may be in a coin form having a diameter in a range of 1 cm to 9 cm and a thickness in a range of 0.1 to 2.0 t. Further, a carbon paper, a carbon fiber, a carbon cloth, carbon felt, a metal thin film, or a combination thereof may be used as the cathode current collector. The carbon paper may minimize a by-product that may be generated by oxidation and reduction reactions of other metal ions contained in the sodium-containing solution.

Further, when a catalyst electrode is disposed on the cathode current collector, reactivity thereof can be further improved. Specifically, the cathode part may further include a catalyst electrode disposed on the cathode current collector, and the catalyst electrode may be made of one material selected from the group consisting of a metal oxide, a novel metal material, a carbon-based material, a perovskite-based material, and a combination thereof.

More specifically, examples of the metal oxide may include $RuO_2$, $MnO_2$, $Co_3O_4$, $TiO_2$, $LiCoO_2$, $Ni(OH)_2$, and the like, examples of the novel metal material may include Pt, Ag, Au, and the like, examples of a carbon-based catalyst may include graphene oxide, a carbon paper, carbon felt, a carbon nano tube, a graphene, carbon nano wire, and the like, and the perovskite-based material may be an oxide represented by the formula ABOx.

Hereinafter, the remaining components included in the coin-type secondary battery will be described, and components that are not described below are generally known in the art.

Materials such as plastic, acryl, polyether ether ketone (PEEK), Teflon, engineering plastic, PC, and the like may be used as the first case and the second case. At this point, each of the first case and the second case may be in a quadrangular form having a width and a length in a range of 4 cm to 30 cm and a thickness in a range of 0.5 to 5.0 t.

Further, the second case may include the one or more openings, as described above, and a diameter of each of the one or more openings in the second case may be in a range of 1 cm to 9 cm, and a shape of each of the one or more openings is not limited.

In this regard, the coin-type secondary battery may further include a bonding part configured to bond the first case to the second case. Materials such as plastic, acryl, PEEK, Teflon, engineering plastic, PC, and the like may be used as the bonding part.

Materials such as a polymer, a paper, cellulose, and the like may be used as the separator, and the separator may be in a coin form having a diameter in a range of 1 cm to 9 cm and a thickness in a range of 0.1 to 2.0 t.

Meanwhile, the anode part may further include a plate spacer, and the plate spacer serves to connect the anode current collector to the anode bottom case while fixing the anode active material in the anode part. At this point, the plate spacer may be in a coin form having a diameter in a range of 1 cm to 9 cm and a thickness in a range of 0.1 to 2.0 t.

According to another embodiment of the present invention, there is provided a method for manufacturing a coin-type secondary battery, the method including bonding one or more solid electrolytes to an anode upper case; forming an anode active material layer on an anode current collector; sequentially stacking the anode current collector and the anode upper case to which the one or more solid electrolytes are bonded on an anode bottom case to obtain an anode part;

sequentially stacking the anode part, a separator, a cathode current collector, and a second case including one or more openings on a first case; bonding the first case to the second case; and introducing an ion-containing solution containing sodium, lithium, magnesium, and a combination thereof from the outside into the second case, wherein, in the bonding of the one or more solid electrolytes to the anode upper case, one or more openings are disposed in the anode upper case, and the one or more solid electrolytes are bonded to the one or more openings in the anode upper case; and, in the introducing of the ion-containing solution containing sodium, lithium, magnesium, and a combination thereof from the outside of the second case, the ion-containing solution flows into the cathode part from the outside of the second case through the one or more openings of the second case.

This is accomplished by a simplified method including manufacturing the anode part including the anode upper case after manufacturing the anode upper case to which the solid electrolyte is bonded; independently preparing each of the components; stacking each of the components in the above-described order; and introducing the ion-containing solution into the cathode part from the outside of the second case, and thus the above method is advantageous when commercializing and mass producing the above-described coin-type secondary battery.

Specifically, to realize the coin-type secondary battery as a large-scale storage system, an ocean, at which seawater, among ion-containing solutions, is abundant, may be selected as a suitable site for installing the coin-type secondary battery such that costs for installation can be reduced and environmental problems can be relatively less caused.

In addition, as described above, the coin-type secondary battery may be finally obtained by the components and the manufacturing method, and the manufacturing method can be more clearly understood through the following embodiments.

Hereinafter, each of operations for manufacturing the coin-type secondary battery will be described in detail.

First, as described above, the manufacturing of the anode part includes bonding the one or more solid electrolytes to the anode upper case; forming the anode active material layer on the anode current collector; and sequentially stacking the anode current collector and the anode upper case to which the one or more solid electrolytes are bonded on the anode bottom case to obtain the anode part.

Specifically, in the bonding of the one or more solid electrolytes to the anode upper case, the one or more openings may be disposed in the anode upper case, and the one or more solid electrolytes may be bonded to the one or more openings in the anode upper case.

More specifically, the bonding of the one or more solid electrolytes to the anode upper case may bond the one or more solid electrolytes to the anode upper case using an adhesive.

The bonding may be performed by a heat treatment, and the heat treatment may be performed at a temperature in a range of 150° C. to 200° C. for 1 to 30 minutes.

At this point, the adhesive may include one or more materials selected from the group consisting of a silicon (Si) based material, an epoxy-based material, and a combination thereof.

The solid electrolyte may be selected from the group consisting of a NASICON, a LISICON, an amorphous ion conductive material, a ceramic ion conductive material, and a combination thereof.

In addition, the form in which the one or more solid electrolytes are bonded to the anode upper case by the adhesive is identical to the above-described form.

The above-described anode active material layer may be formed on a surface of the anode current collector, and the anode active material layer is manufactured by mixing an anode active material, a binder, and a conductive material in a solvent for manufacturing an active material composition, and applying the active material composition to a current collector. Such an electrode manufacturing method is well known in the art, and thus a detailed description thereof will be omitted herein. N-methylpyrrolidone or the like may be used as the solvent, but the present invention is not limited thereto.

As described above, after the manufacturing of the anode part is performed, the sequential stacking of the anode part, the separator, the cathode current collector, and the second case including the one or more openings may be performed.

As a result of performing the sequential stacking, a detailed order in which each of the components is stacked while performing the sequential stacking is not limited as long as the stacked structure in the above-described order can be obtained.

For example, as in an embodiment which will be described below, after disposing the manufactured anode part on the first case, the detailed order of the stacking may include disposing the separator on the anode part disposed on the first case, disposing the catalyst electrode thereon, disposing the cathode current collector on the catalyst electrode, and then disposing the second case thereon, but the present invention is not limited to the detailed order of the stacking.

The anode part and the cathode part may be sealed by the first case and the second case which are bonded through the bonding of the first case and the second case. At this point, as described above, the bonding may be performed by the bonding part.

The introducing of the ion-containing solution containing sodium, lithium, magnesium, and a combination thereof into the second case from the outside thereof is performed that the ion-containing solution flows into the cathode part from the outside of the second case through the opening in the second case, and thus this process may include bonding the first case and the second case and then immersing the first case and the second case, which are bonded, into the ion-containing solution. Through such operations, the ion-containing solution may be present at an outer side of each of the first case and the second case, and thus the ion-containing solution may flow from the outside of the second case into the cathode part.

Hereinafter, preferred examples of the present invention will be described. However, the following examples are merely one preferred embodiment of the present invention, and the present invention is not limited to the following examples.

Example 1: Manufacture of Coin-Type Secondary Battery

To manufacture the coin-type secondary battery shown in FIG. 3, after an anode part was manufactured, a series of processes of disposing the anode part on a first case, disposing a separator on the anode part disposed on the first case, disposing a catalyst electrode on the separator, disposing a cathode current collector on the catalyst electrode, and disposing a second case thereon were performed. Hereinafter, the processes will be described in detail.

(1) Manufacture of Anode Part

As will be described below, the process of manufacturing the anode part was performed by manufacturing each of an assembled anode upper case and an assembled anode bottom case and then bonding the anode upper case and the anode bottom case to each other.

1) Manufacture of Assembled Anode Bottom Case

A welded plate spacer was manufactured by welding an anode current collector (having a diameter of Φ10 mm) onto a plate spacer (having a diameter of Φ19 mm). An assembled anode plate was manufactured by fixing an anode active material onto the welded plate spacer.

At this point, a sodium metal was used as the anode active material, and the anode active material was press-fixed onto the welded plate spacer.

Subsequently, a metal foam spacer (having a width of 4 mm and a length of 4 mm), the assembled anode plate, and an anode separator (having a diameter of 20 mm) were sequentially placed on an anode bottom case (having a diameter of Φ19 mm), and then a predetermined amount of a liquid electrolyte (e.g., a $NaCF_3SO_3$ solution) was injected therein to manufacture the assembled anode bottom case.

2) Manufacture of Assembled Anode Upper Case

Independently, an assembled anode upper case was manufactured by bonding a solid electrolyte to an opening of an anode upper case (i.e., a punched anode upper case having a diameter of Φ20 mm) using a silicone-based adhesive.

Specifically, the number of openings in the anode upper case and the number of the solid electrolytes are each one.

Also, during the bonding, the anode upper case at which the opening was formed was disposed on one side of the solid electrolyte, and the solid electrolyte was bonded to the anode upper case by applying heat with a temperature of 180° C. thereto for 10 minutes.

3) Manufacture of Anode Part

The assembled anode bottom case and the assembled anode upper case were pressed and fixed to each other to complete the anode part. At this point, the press-fixing was performed using a crimper.

(2) Manufacture of Coin-Type Secondary Battery

The completed anode part was fixed to a first case (having a width of 4 cm and a length of 4 cm) made of a plastic material. A separator (having a diameter: Φ19 mm) made of a polymer and a carbon-based catalyst electrode were sequentially disposed on the anode part fixed to the first case, and then the carbon-based catalyst electrode was covered with a second case (having a width of 4 cm and a length of 4 cm).

Specifically, a second case in which three openings were formed was used.

Subsequently, the first case and the second case were bonded using a plastic fix bar made of a plastic material as a bonding part, and were immersed in seawater (purchased from Sigma-Aldrich) to allow the seawater to flow into the first case and the second case through the opening of the second case, thereby completing the coin-type secondary battery.

Evaluation Example 1: Evaluation of Electrochemical Characteristic of Coin-Type Secondary Battery Electrochemical evaluation was performed five times on the coin-type secondary battery of Example 1.

Specifically, the evaluation results according to each of the evaluations are shown below in Table 1.

TABLE 1

| | Evaluation Results | | | | |
|---|---|---|---|---|---|
| Evaluation Times | Open Circuit Voltage (OCV) | Charge Voltage | Discharge Voltage | Ohmic Resistance | Columbic Efficiency |
| 1 | 2.85 V | 3.80 V | 2.78 V | 58.3 Ω | 93% |
| 2 | 2.91 V | 3.83 V | 2.81 V | 59.4 Ω | 95% |
| 3 | 2.87 V | 3.79 V | 2.79 V | 58.1 Ω | 94% |
| 4 | 2.90 V | 3.81 V | 2.80 V | 59.3 Ω | 92% |
| 5 | 2.88 V | 3.77 V | 2.78 V | 58.2 Ω | 90% |

Figure 6:
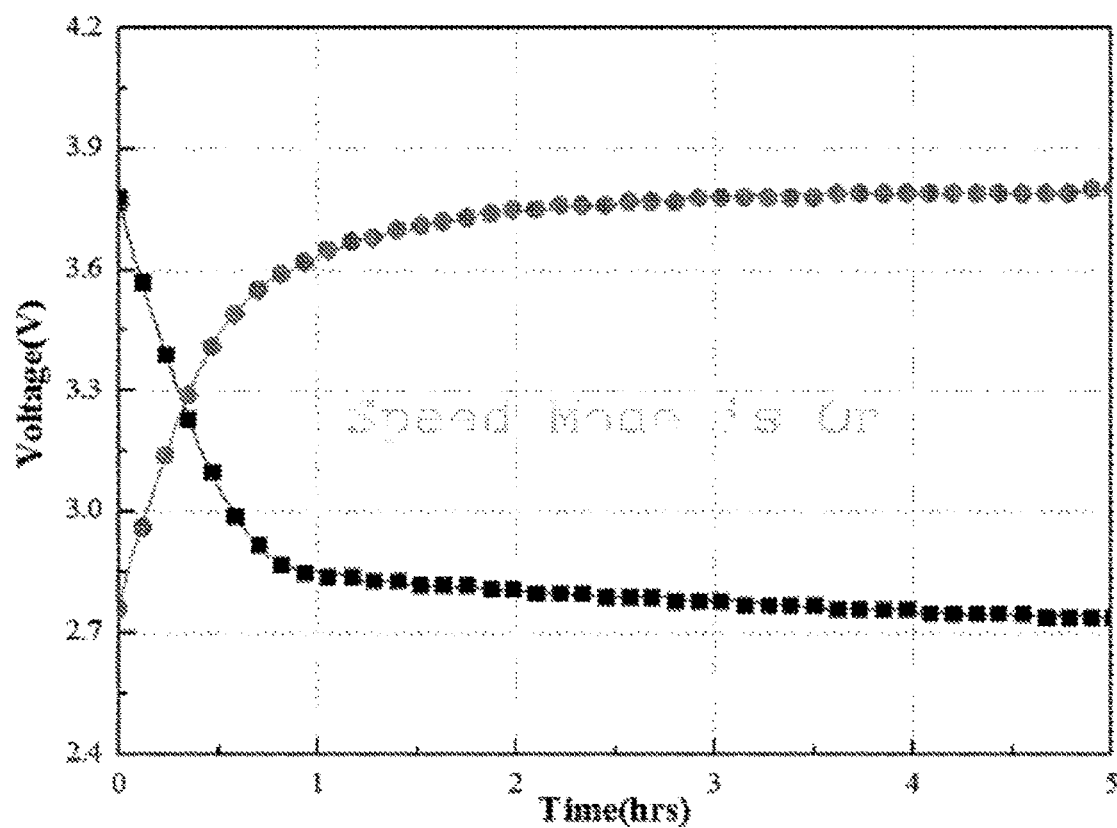
FIG. 6 is a graph illustrating a charge and discharge characteristic evaluation of the coin-type secondary battery according to one embodiment of the present invention.

Specifically, as shown in Table 1 and FIG. 6, as a result of charging and discharging the coin-type secondary battery of Example 1 in seawater, an open circuit voltage (OCV), a charging voltage, a discharge voltage, and resistance were each measured, and coulombic efficiency was calculated on the basis of these measured values. Thus, it can be seen that the coin-type secondary battery of Example 1 exhibited superior coulombic efficiency of 90% or more.

Meanwhile, an apparatus for charging and discharging a coin-type secondary battery will be described below.

Figure 7:
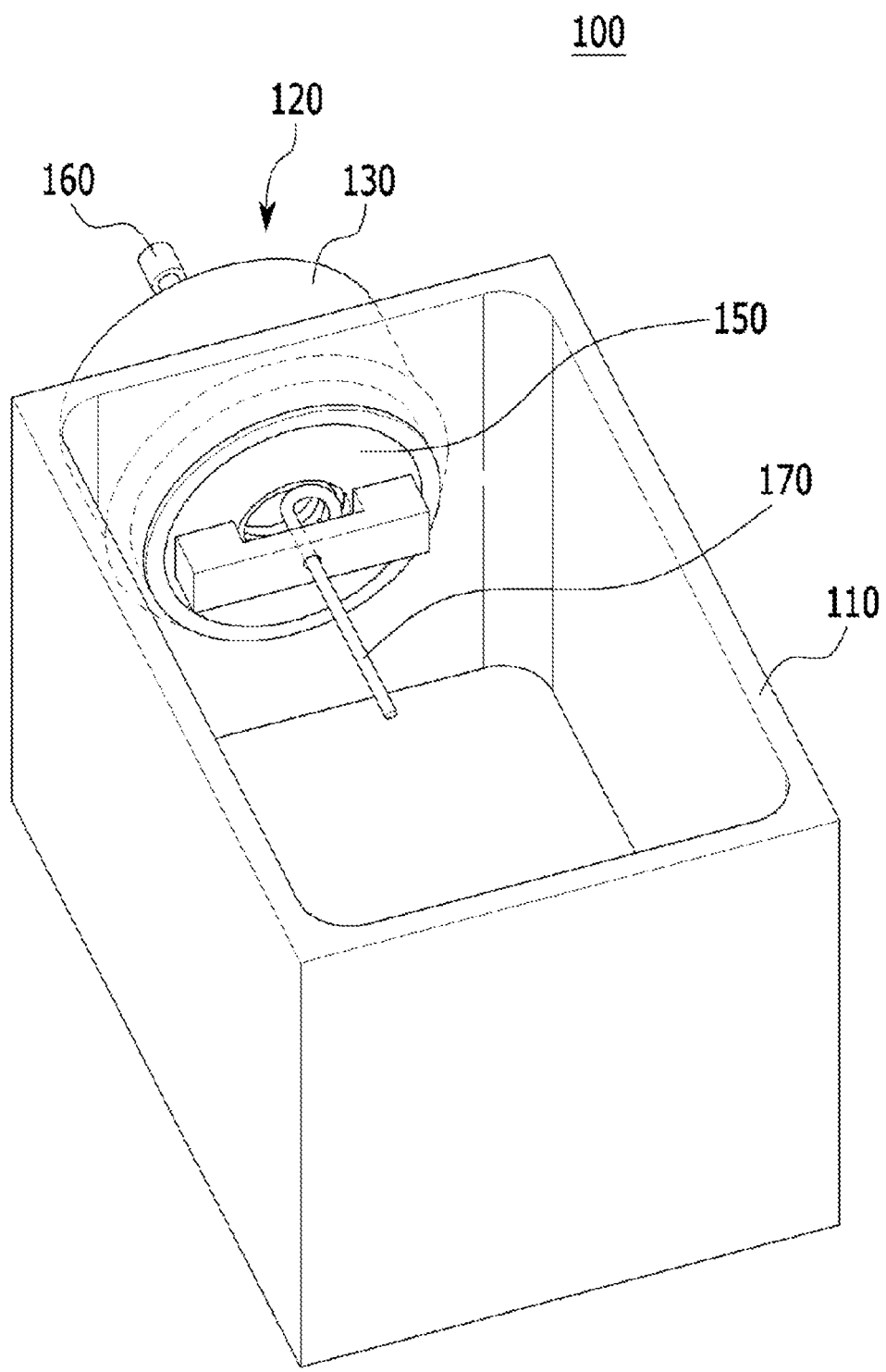
FIG. 7 is a perspective view of an apparatus for charging and discharging a coin-type secondary battery according to the present embodiment.
Figure 8:
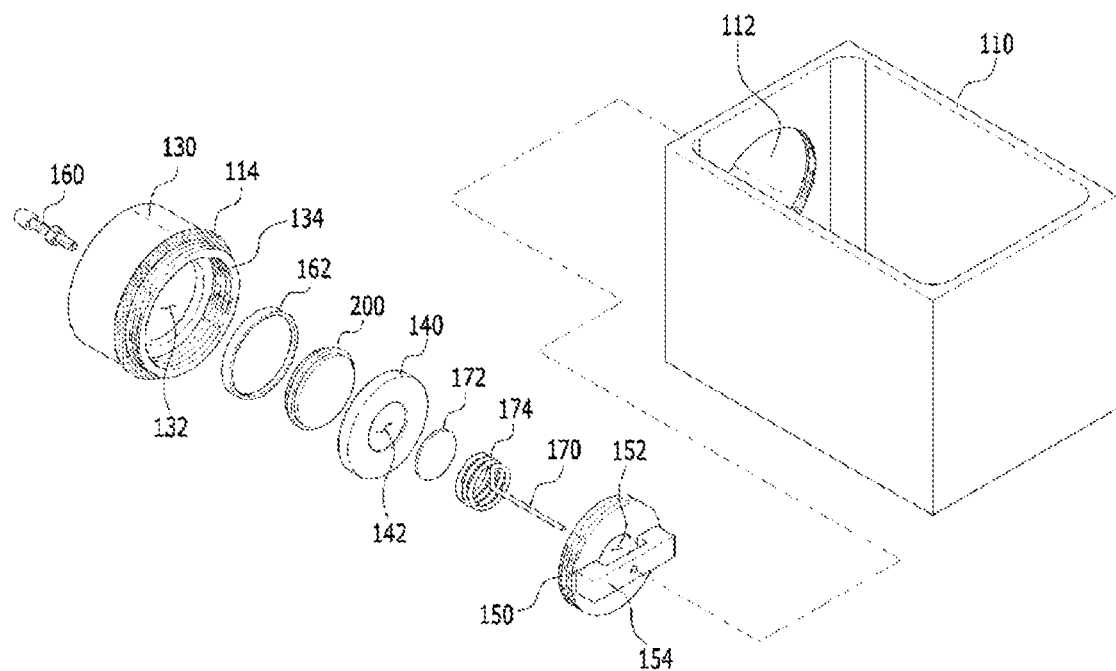
FIG. 8 is an exploded perspective view illustrating a configuration of the apparatus for charging and discharging a coin-type secondary battery according to the present embodiment.
Figure 9:
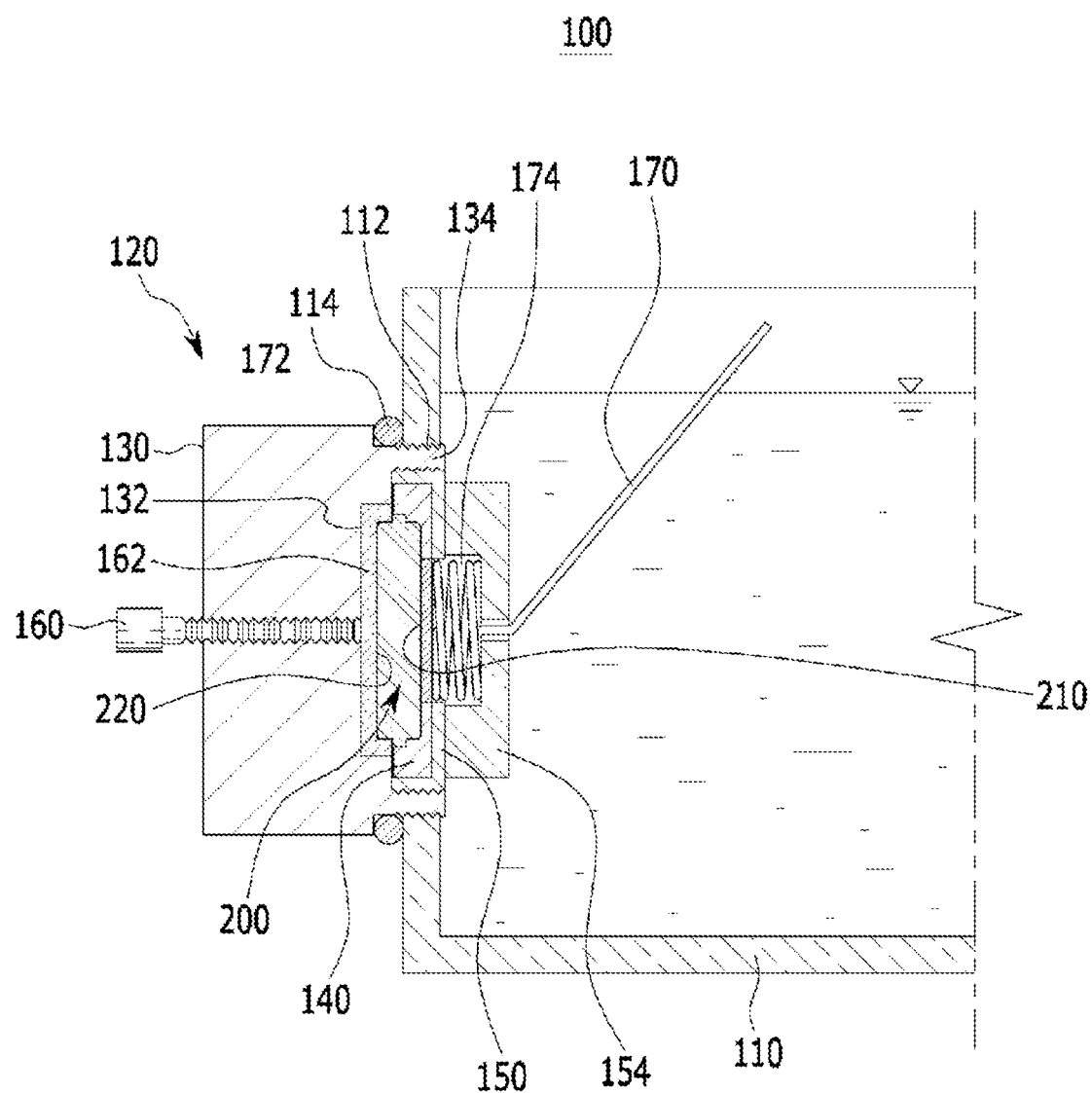
FIG. 9 is a schematic cross-sectional view of the apparatus for charging and discharging a coin-type secondary battery according to the present embodiment.

FIG. 7 shows an exterior of the apparatus for charging and discharging a coin-type secondary battery according to the present embodiment. FIG. 8 shows an exploded structure of the apparatus for charging and discharging a coin-type secondary battery, and FIG. 9 shows a cross-sectional structure of the apparatus for charging and discharging a coin-type secondary battery in a coupled state.

Hereinafter, components of the apparatus for charging and discharging a coin-type secondary battery will be described with reference to FIGS. 7 to 9.

A charging and discharging apparatus 100 of the present embodiment includes a vessel 110 filled with a solution containing water or sodium ions, and a jig part 120 installed at the vessel 110, in which a coin-type secondary battery 200 is installed, and configured to allow a cathode part 210 of the coin-type secondary battery 200 to come into contact with the solution in the vessel 110.

Further, to connect a load such as a current or a resistor to the coin-type secondary battery 200, the charging and discharging apparatus 100 may further include an anode terminal installed at the jig part 120 and electrically connected to an anode part 220 of the coin-type secondary battery 200, and a cathode terminal electrically connected to the cathode part 210 of the coin-type secondary battery 200.

Thus, the cathode part 210 of the coin-type secondary battery 200 is brought into contact with the solution, and a current is applied to the secondary battery 200 or a resistor is connected thereto such that the secondary battery 200 may be charged and discharged. Here, for example, the coin-type secondary battery 200 may be understood as being a battery in a state in which a first case and second case thereof are removed to facilitate charging and discharging.

The solution may be a solution, e.g., seawater, containing sodium required for charging the coin-type secondary battery 200. Further, when the coin-type secondary battery 200 is discharged, an aqueous solution containing water may be applied thereto as the solution in addition to the solution containing sodium. For example, seawater used for charging may be used for discharging, and, alternatively, only water may be used as the solution.

A solution accommodation space is formed inside the vessel 110, and an upper end of the vessel 110 is open to enable the solution to be supplied thereto or discharged therefrom. A size and form of the vessel 110 may be variously modified and are not particularly limited. The vessel 110 may be made of a material that is not corroded or deformed by seawater so that seawater may be accommodated therein.

A hole is formed to pass through one side of the vessel 110 and be coupled to the jig part 120. Thus, the jig part 120 is coupled to the hole of the vessel 110 to bring the cathode part 210 of the coin-type secondary battery 200 into contact with the solution. In the present embodiment, the jig part 120 is detachably coupled to the hole of the vessel 110. Accordingly, the jig part 120 at which the coin-type secondary battery 200 is installed may be separated from the vessel 110 accommodating the seawater to more easily install the secondary battery 200 at the jig part 120. An attachment and detachment structure of the jig part 120 with respect to the vessel 110 will be described in more detail below.

The jig part 120 allows only the cathode part 210 of the coin-type secondary battery 200 to be in contact with the solution accommodated inside the vessel 110.

To this end, the jig part 120 includes a case 130 installed at the vessel 110 and having a seating part 132 formed at a front surface of the case 130 facing an interior of the vessel 110 and the seating part 132 at which the coin-type secondary battery 200 is seated; a sealing member 140 installed to surround an outer circumference of the coin-type secondary battery 200 and coupled inside the case 130 to seal between the anode part 220 of the coin-type secondary battery 200 and the case 130 and block the solution from flowing into the anode part 220; and a cover member 150 coupled to the front surface of the case 130, configured to pressurize the sealing member 140 such that the sealing member 140 is brought into close contact with the front surface, and having a hole 152 formed at a front surface of the cover member 150 to expose the cathode part 210 of the coin-type secondary battery 200.

Thus, the anode part 220 of the coin-type secondary battery 200 is sealed in the case 130 by the sealing member 140 in close contact between the case 130 and the cover member 150 so that only the cathode part 210 is brought into contact with the solution of the vessel 110 through the hole 152 of the cover member 150, and thus the solution is blocked from flowing into the anode part 220.

The case 130 may be configured with a circular cross-sectional structure like the coin-type secondary battery 200. The form of the case 130 may be variously modified and is not limited to a circular form. The seating part 132 is formed as a recess at a center of the front surface of the case 130, which communicates with the interior of the vessel 110, to allow the secondary battery 200 to be seated at the seating part 132. Further, a flange 134 is formed to protrude from the case 130 to surround the seating part 132 along an outer circumference of the front surface thereof.

The case 130 may be installed at the vessel 110 in a screw-coupled manner A male screw thread is formed on an outer circumferential surface of the circular flange 134 formed along the outer circumference of the front surface of the case 130, and a hole formed at a side surface of the vessel 110 constitutes a female thread hole 112 having a female screw thread formed on an inner circumferential surface thereof such that the flange 134 of the case 130 may be screw-coupled to and installed at the female thread hole 112.

A ring member 114 for sealing may be installed at the flange 134 of the case 130 to prevent leakage of the solution between the flange 134 of the case 130 and the female thread hole 112 of the vessel 110 such that a structure sealing between the case 130 and the vessel 110 may be configured thereby.

Thus, the jig part 120 may allow the flange 134 of the case 130 to be screw-coupled to the female thread hole 112 of the vessel 110 and easily attached to or detached from the case 130.

The jig part 120 is mounted on the vessel 110 and accommodates the coin-type secondary battery 200 to be charged and discharged inside the jig part 120. The coin-type secondary battery 200 is disposed inside the flange 134 of the case 130, and is fixed by the cover member 150 coupled to the flange 134 of the case 130.

The cover member 150 is configured with a circular cross-sectional structure. The cover member 150 is configured with a structure in which an interior into which the sealing member 140 is fittable is provided and the hole 152 is formed to pass through a central portion of the front surface of the cover member 150.

The cover member 150 may be attached to the flange 134 of the case 130 in a screw-coupling manner. The cover member 150 may be configured with a structure in which a male screw thread is formed on an outer circumferential surface of a distal end of the cover member 150, and a female screw thread is formed on an inner circumferential surface of the flange 134 of the case 130 so that the cover member 150 is screw-coupled to the flange 134 of the case 130 to be detachably installed at the flange 134 of the case 130.

Thus, the cover member 150 may be screw-coupled to the flange 134 of the case 130 to be easily attached to or detached from the case 130.

A handle 154 is formed to protrude from the cover member 150 to allow cover member 150 to be rotated with respect to the case 130. The handle 154 has a structure lengthy extending and passing a central axis of the cover member 150, and is formed across the hole 152 formed at the central portion of the cover member 150. The handle 154 is formed to have a thickness that is sufficiently smaller than a diameter of the hole 152 formed at the cover member 150 to not interfere with the hole. Accordingly, even though the handle 154 is formed across the hole 152, the hole 152 is not blocked by the handle 154 and communicates with the outside.

The sealing member 140 is configured with a structure constituting a ring form in which a hole 142 is formed to expose the cathode part 210 of the coin-type secondary battery 200, and in which an inner circumferential surface of the sealing member 140 is processed and stepped to correspond to the outer circumference of the coin-type secondary battery 200 to surround the outer circumference thereof. In the present embodiment, the sealing member 140 may be formed of a silicon material.

As shown in FIG. 9, the sealing member 140 is pressurized by the cover member 150 inside the flange 134 of the case 130 to seal the anode part 220 of the secondary battery 200. When the cover member 150 is attached to the case 130, the sealing member 140 surrounding the coin-type secondary battery 200 is brought into close contact between the case 130 and the cover member 150 such that the sealing member 140 seals between the anode part 220 of the coin-type secondary battery 200 and the case 130. Consequently, a flow of the solution toward the secondary battery 200 through the hole 152 of the cover member 150 is blocked by the sealing member 140 such that the solution does not move to the anode part 220 of the secondary battery 200.

To charge and discharge the coin-type secondary battery 200 mounted on the jig part 120, a current or load should be connected to the coin-type secondary battery 200. Thus, the cathode terminal and the anode terminal are provided at the jig part 120 to be electrically connected to the cathode part 210 and the anode part 220 of the coin-type secondary battery 200 disposed inside the jig part 120.

The anode terminal may include an anode rod 160 installed to pass through an interior of the case 130 and electrically connected to the anode part 220 of the coin-type secondary battery 200.

The anode rod 160 is configured in the form of a long extending bar, and passes through the center of the case 130 from the outside thereof to extend to the interior of the case 130. Thus, the anode part 220 of the secondary battery 200 is electrically connectable to the outside of the case 130 through the anode rod 160.

The anode terminal may further include an electrode plate 162 installed at the seating part 132 of the case 130 to be in contact with the anode part 220 of the coin-type secondary battery 200, and the anode rod 160 may be configured with a structure electrically connected to the anode part 220 of the coin-type secondary battery 200 through the electrode plate 162.

The electrode plate 162 has a circular plate structure and has a recess formed to allow the anode part 220 of the coin-type secondary battery 200 to be bonded to the electrode plate 162. The seating part 132 of the case 130 may be formed to have a size corresponding to an exterior of the electrode plate 162.

Accordingly, the anode part 220 of the coin-type secondary battery 200 may be electrically connected to the anode rod 160 through the electrode plate 162, and a current or load may be connected to the anode part 220 of the secondary battery 200 through the anode rod 160 extending to the outside of the case 130.

In the present embodiment, the anode terminal may have a structure in which the electrode plate 162 is pressurized against the anode part 220 of the secondary battery 200.

To this end, the anode terminal is configured with a structure in which the anode rod 160 is in a bolt form and is screw-coupled to the case 130. Accordingly, when the anode rod 160 is rotated and tightened against the case 130, the anode rod 160 pressurizes the electrode plate 162 such that the electrode plate 162 is brought into close contact with the anode part 220 of the coin-type secondary battery 200.

As described above, the anode rod 160 is tightened to pressurize the electrode plate 162, and thus the secondary battery 200 pressurized by the electrode plate 162 is brought into closer contact with the sealing member 140 in the case 130 such that a sealing effect thereof can be further enhanced.

The cathode terminal may include a cathode rod 170 installed to pass through an interior of the cover member 150 and be electrically connected to the cathode part 210 of the coin-type secondary battery 200.

In the present embodiment, since the cathode rod 170 is in contact with the solution such as seawater and the like, the cathode rod 170 may be formed of a titanium material that is not corroded by seawater.

The cathode rod 170 is in the form of a long extending bar, and passes through the handle 154 formed at the cover member 150 from the outside thereof to extend to the interior of the case 130. Thus, the cathode part 210 of the secondary battery 200 is electrically connectable to the outside of the cover member 150 through the cathode rod 170. An outer distal end of the cathode rod 170 may extend above the vessel 110 to be exposed over the solution accommodated in the vessel 110.

In the present embodiment, the cathode terminal may further include carbon felt 172 installed between the cathode rod 170 and the cathode part 210 of the coin-type secondary battery 200 to be in contact with the cathode part 210. The carbon felt 172 is formed to have a diameter corresponding to a diameter of the hole 142 of the sealing member 140, and is disposed on the hole to be in contact with the cathode part 210.

The carbon felt 172 is brought into contact with the cathode part 210 of the coin-type secondary battery 200 to serve as a current collector of the cathode part 210.

Further, the cathode terminal is configured with a structure tightly pressurizing the carbon felt 172 to allow the carbon felt 172 to be brought into closer contact with the cathode part 210 of the coin-type secondary battery 200. To this end, the cathode rod 170 may have a structure in which a distal end of the cathode rod 170, which is brought into contact with the cathode part 210 of the coin-type secondary battery 200, is wound in a coil form to constitute a coil spring 174 configured to apply an elastic force between the cover member 150 and the cathode part 210. A diameter of the coil spring 174 is not particularly limited as long as the coil spring 174 can pressurize the carbon felt 172.

As described above, the coil spring 174 constituting the inner distal end of the cathode rod 170 applies the elastic force to the carbon felt 172 in a state of being engaged with and supported by the handle 154 of the cover member 150, thereby tightly pressurizing the carbon felt 172 toward the cathode part 210 of the secondary battery 200. Consequently, the carbon felt 172 is brought into close contact with the cathode part 210 such that a current collecting effect thereof can be enhanced.

Figure 10:
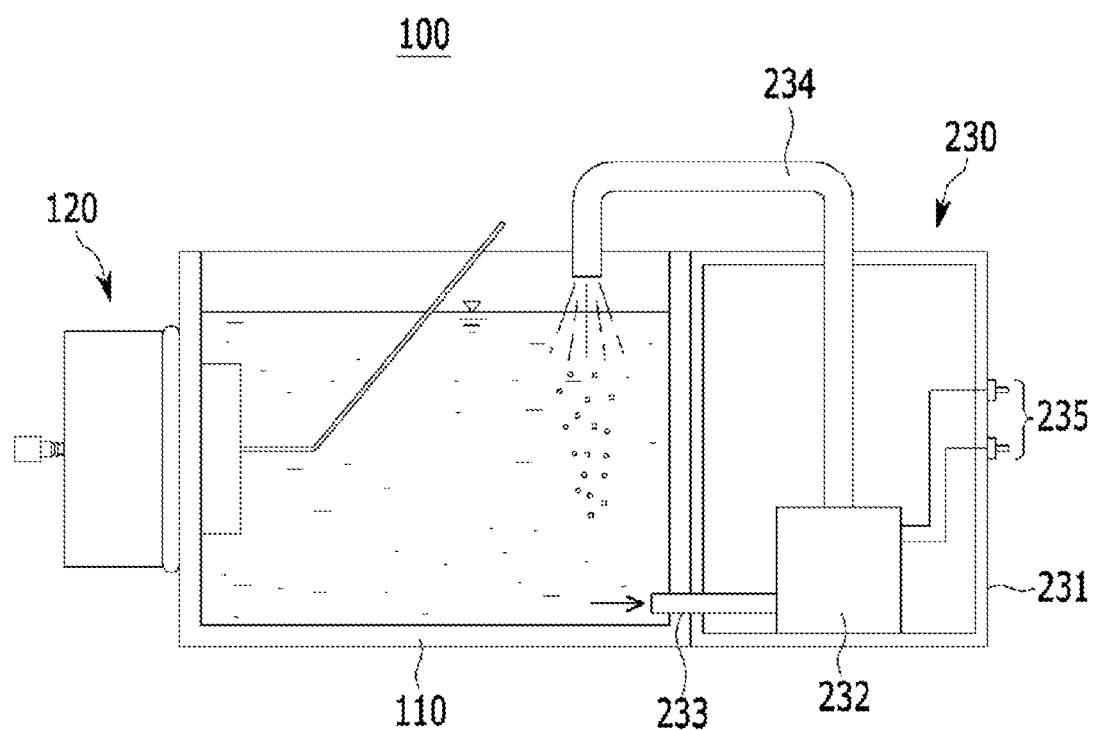
FIG. 10 is a schematic cross-sectional view of an apparatus for charging and discharging a coin-type secondary battery according to another embodiment.

FIG. 10 shows another embodiment of the apparatus for charging and discharging a coin-type secondary battery.

The charging and discharging apparatus 100 of the present embodiment is configured with a structure circulating a solution in the vessel 110 to supply oxygen to the solution. Since the structure of the charging and discharging apparatus of the present embodiment is the same as that of the other embodiments except for the oxygen supply structure, the same reference numerals will be assigned to the components which have been described in the following description, and thus detailed descriptions thereof will be omitted.

As shown in FIG. 10, the charging and discharging apparatus 100 of the present embodiment further includes an oxygen supplier 230 configured to supply oxygen to the solution of the vessel 110.

Oxygen is supplied to the solution such that discharge efficiency of the charging and discharging apparatus for the coin-type secondary battery can be increased.

The oxygen supplier 230 may include a circulation pipe 233 connected to the vessel 110 in which the solution is accommodated, and configured to discharge the solution; a pump 232 connected to the circulation pipe 233 and configured to circulate the solution; and a discharge pipe 234 connected to an outlet side of the pump 232, extending above the vessel, and configured to discharge the solution discharged through the pump 232 over a surface of the solution of the vessel 110.

A housing 231 for installing the pump 232 is coupled to an outer side of the vessel. The pump 232 and a configuration for driving the pump 232 or adjusting a flow rate thereof may be provided inside the housing 231. In addition, in order to manipulate the pump 232, an on-off switch of the pump 232 or a switch 235 configured to adjust a flow rate of the pump 232 may be installed at an outer side of the housing 231.

An inlet side of the pump 232 is directly connected to the interior of the vessel through the circulation pipe 233. For example, the circulation pipe 233 may be installed to pass through a lower side surface of the vessel 110 to be connected to the inlet side of the pump 232. Accordingly, the solution accommodated in the vessel 110 flows into the pump 232 through the circulation pipe 233.

The outlet side of the pump 232 is connected to an upper portion of the vessel via the discharge pipe 234. A distal end of the discharge pipe 234 extending to the upper portion of the vessel 110 is disposed and spaced apart from the surface of the solution not to be in direct contact with the solution accommodated in the vessel. Thus, the solution transferred to the discharge pipe 234 according to the driving of the pump 232 is discharged from the distal end of the discharge pipe 234 to drop onto the surface of the solution.

During the above-described procedure, air bubbles flow into the solution accommodated in the vessel along with the solution dropping from the discharge pipe 234 such that oxygen in the air is supplied to the solution. The solution is continuously circulated according to the driving of the pump 232, and air is supplied to the solution such that oxygen in the air is continuously supplied to the solution.

As described above, oxygen is continuously supplied to the solution such that discharge efficiency can be further increased.

That is, since oxygen ($O_2$) is required for a discharge due to a discharging mechanism of the coin-type secondary battery, the solution is circulated as described above to continuously supply oxygen in the air to the solution according to the apparatus of the present invention such that discharge reaction efficiency can be maximized.

Further, the solution is circulated to continuously drop over the solution of the vessel such that the apparatus of the present embodiment can closely simulate an actual seawater situation in which waves are rippling. Therefore, a charge and discharge test for a coin-type secondary battery can be easily performed under conditions similar to actual seawater conditions.

Hereinafter, charging and discharging procedures of a coin-type secondary battery through the charging and discharging apparatus according to the present embodiment will be described.

Charging and discharging of the coin-type secondary battery 200 may be easily performed through the charging and discharging apparatus 100 of the present embodiment.

Since the jig part 120 on which the secondary battery 200 is mounted is separated from the vessel 110 in which a solution is accommodated, the jig part 120 can be separated from the vessel 110 to allow the secondary battery 200 to be easily mounted thereon.

To mount the secondary battery 200 on the jig part 120, the sealing member 140 is first installed at the coin-type secondary battery 200. Since the sealing member 140 is configured in a ring form, the sealing member 140 is coupled to surround the outer circumferential surface of the coin-type secondary battery 200. The cathode part 210 and the anode part 220 of the secondary battery 200 are each exposed through both of the open surfaces of the sealing member 140.

The sealing member 140 coupled to the secondary battery 200 is seated on the seating recess of the case 130. Since the electrode plate 162 in contact with the anode part 220 of the secondary battery 200, which is fitted in the electrode plate 162, is mounted on the seating recess of the case 130, the anode part 220 of the secondary battery 200 is coupled to the electrode plate 162 and is disposed inside the case 130.

In this state, the carbon felt 172 is disposed at the cathode part 210 of the secondary battery 200, and the cover member 150 is coupled to the case 130. When the cover member 150 is completely coupled to the case 130, the sealing member 140 is pressurized by the cover member 150 such that the cover member 150, the secondary battery 200, and the case 130 are brought into close contact with each other by the sealing member 140, thereby sealing between the anode part 220 of the secondary battery 200 and the case 130. Consequently, when the solution inside the vessel 110 flows into the jig part 120, the solution is blocked by the sealing member 140 not to move to the anode part 220 of the secondary battery 200.

Here, when the cover member 150 is coupled to the case 130 in a state in which the cathode rod 170 at which the coil spring 174 is formed is mounted on the cover member 150, the coil spring 174 pressurizes the carbon felt 172 such that the carbon felt 172 is brought into close contact with the cathode part 210 of the secondary battery.

In this state, when the anode rod 160 mounted on the case 130 is rotated and tightened in one direction, the anode rod 160 enters into the interior of the case 130 to push the electrode plate 162. Consequently, the electrode plate 162 pressurizes the secondary battery 200 such that current collecting efficiency by the electrode plate 162 and the carbon felt 172 can be maximized. Further, as the electrode plate 162 pressurizes the secondary battery 200, an adhering force of the sealing member 140 is increased such that a sealing effect of the anode part 220 against the solution can be further enhanced.

When assembly of the jig part 120 is completed, the jig part 120 is bonded to the vessel 110. When the jig part 120 is screw-coupled to the female screw thread formed on the hole of the vessel 110, the cover member 150 of the jig part 120 is disposed inside the vessel 110. In this state, the solution is supplied to the vessel 110. Thus, the solution flows into the jig part 120 through the hole 152 formed at the cover member 150 to come into contact with the cathode part 210 of the secondary battery 200 installed at the jig part 120. The anode part 220 of the secondary battery 200 is disposed at a side opposite the cathode part 210, and is sealed by the sealing member 140 so as not to be brought into contact with the solution.

In the case of charging the secondary battery, a solution containing sodium, e.g., seawater, is supplied to the vessel 110. Further, a current is applied to the anode rod 160 and the cathode rod 170, which are mounted on the jig part 120, so that the coin-type secondary battery 200 may be charged.

When the current is applied to the anode rod 160 and the cathode rod 170, sodium ions contained in the solution move to the cathode part 210 of the secondary battery 200 through the carbon felt 172. Thus, charging of the coin-type secondary battery 200 is performed.

In the case of discharging the secondary battery, seawater may be used as the solution or water can be separately supplied into the vessel 110. When a load is applied to the anode rod 160 and the cathode rod 170, which are mounted on the jig part 120, in a state in which the solution such as seawater or the like is filled in the vessel 110, sodium ions move from the cathode part 210 of the secondary battery 200 to the solution in contact with the cathode part 210 such that discharge is performed.

In the discharge procedure, the seawater in the vessel 110 is circulated by the pump 232 being driven to supply oxygen to the solution if necessary, and thus discharge efficiency can be further increased.

As described above, the coin-type secondary battery 200 may be easily charged or discharged using the solution such as seawater and the like through the charging and discharging apparatus 100 of the present embodiment.

Those skilled in the art should understand that the present invention is not limited to the above-described embodiments and may be implemented in various forms, and other embodiments may be realized without departing from the technical spirit and essential features of the present invention. Therefore, it should be understood that the above-described embodiments are not restrictive but illustrative in all aspects.

The invention claimed is:

1. A coin-type secondary battery comprising:
    an anode part;
    a cathode part;
    a separator disposed between the anode part and the cathode part, wherein the separator is a non-electric conductive diaphragm, and prevents a short circuit between the anode part and the cathode part;
    a first case disposed outside the anode part; and
    a second case disposed outside the cathode part and including one or more openings,
    wherein:
    the first case and the second case are bonded to each other;
    the anode part, the separator, and the cathode part are sealed by the first case and the second case which are bonded;
    the anode part includes an assembled anode bottom case, an in-anode separator, and an assembled anode upper case;
    the assembled anode bottom case includes an anode bottom case, an anode current collector disposed on the anode bottom case, an anode active material layer disposed on the anode current collector and a liquid electrolyte;
    the assembled anode upper case includes one or more solid electrolytes, and an anode upper case bonded to the one or more solid electrolytes;
    the assembled anode bottom case, the in-anode separator and the assembled anode upper case are sequentially stacked in the anode part;
    the one or more solid electrolytes, the in-anode separator, the liquid electrolyte, the anode active material layer, the anode current collector, the assembled anode bottom case are sealed by the assembled anode bottom case and the assembled anode upper case which are bonded;
    a gasket has a direct contact with an inner side surface of the anode bottom case, an outer side surface of the anode upper case, and the liquid electrolyte, and prevents leakage of the liquid electrolyte injected into the anode part;
    the one or more solid electrolytes are bonded to the anode upper case and disposed at one or more openings in the anode upper case;
    the cathode part includes an ion-containing solution containing sodium, lithium, magnesium, and a combination thereof, and a cathode current collector impregnated into the ion-containing solution, wherein the cathode current collector comprises at least one selected from the group consisting of a carbon paper, a carbon fiber, a carbon cloth, carbon felt, and a metal thin film; and
    the ion-containing solution flows into the cathode part from the outside of the second case through the one or more openings of the second case.

2. The coin-type secondary battery of claim 1, wherein the anode part further includes an adhesive disposed on each of the one or more solid electrolytes which are disposed at the one or more openings in the anode upper case, and configured to bond the solid electrolyte to the anode upper case.

3. The coin-type secondary battery of claim 2, wherein the adhesive includes one or more materials selected from the group consisting of a silicon (Si) based material, an epoxy-based material, and a combination thereof.

4. The coin-type secondary battery of claim 1, wherein, in the anode part, each of the one or more solid electrolytes is selected from the group consisting of a Na superionic conductor (NASICON), a Li superionic conductor (LISICON), an amorphous ion conductive material, a ceramic ion conductive material, and a combination thereof.

5. The coin-type secondary battery of claim 1, wherein the anode active material layer includes an anode active material, and the anode active material is one or more materials selected from the group consisting of a metal, a metal oxide, a metal sulfide, a metal phosphide, a carbon-based material, and a combination thereof.

6. The coin-type secondary battery of claim 1, wherein the liquid electrolyte includes a dissociable salt and an organic solvent.

7. The coin-type secondary battery of claim 6, wherein the dissociable salt is one or more materials selected from the group consisting of a sodium compound, a lithium compound, an ammonium compound, and a combination thereof.

8. The coin-type secondary battery of claim 6, wherein the organic solvent is one or more materials selected from the group consisting of an ether-based organic solvent, a carbonate-based organic solvent, a nitrile-based organic solvent, and a combination thereof.

9. The coin-type secondary battery of claim 1, wherein, in the cathode part, the ion-containing solution containing sodium, lithium, magnesium, and a combination thereof is selected from the group consisting of seawater, salty water, and a combination thereof.

10. The coin-type secondary battery of claim 1, wherein the cathode part further includes a catalyst electrode disposed on the cathode current collector, and the catalyst electrode includes one material selected from the group consisting of a metal oxide, a novel metal material, a carbon-based material, a perovskite-based material, and a combination thereof.

* * * * *